United States Patent [19]

Dunbobbin et al.

[11] Patent Number: 4,944,934
[45] Date of Patent: Jul. 31, 1990

[54] HIGH TEMPERATURE OXYGEN RECOVERY WITH REVERSIBLE CHEMICAL REACTION

[75] Inventors: Brian R. Dunbobbin, Allentown, Pa.; Richard T. Carlin, Tuscaloosa, Ala.; Anthony A. Cassano, Allentown, Pa.

[73] Assignee: Air Products and Chemicals, Inc., Allentown, Pa.

[21] Appl. No.: 460,467

[22] Filed: Jan. 3, 1990

[51] Int. Cl.$^5$ .............................................. C01B 13/00
[52] U.S. Cl. .............................. 423/579; 423/210.5; 423/219
[58] Field of Search ............... 423/210.5, 219, 579

[56] References Cited

U.S. PATENT DOCUMENTS

| 3,310,381 | 3/1967 | Guerrieri | 23/221 |
|---|---|---|---|
| 3,579,292 | 5/1971 | Mullhaupt et al. | 423/579 |
| 3,980,763 | 9/1976 | Mullhaupt | 423/579 |
| 4,132,766 | 1/1979 | Erickson | 423/579 |
| 4,287,170 | 9/1981 | Erickson | 423/579 |
| 4,340,578 | 7/1982 | Erickson | 423/579 |
| 4,521,398 | 6/1985 | Erickson | 423/579 |
| 4,526,775 | 7/1985 | Cassano | 423/579 |
| 4,529,577 | 7/1985 | Chen et al. | 423/351 |
| 4,617,182 | 10/1986 | Brown et al. | 423/579 |
| 4,708,860 | 11/1987 | Weimer | 423/579 |
| 4,746,502 | 5/1988 | Erickson | 423/579 |
| 4,800,070 | 1/1989 | Carlin et al. | 423/210.5 |

OTHER PUBLICATIONS

P. Hautefeuille; C. R. Acad. Sci., 90, 744 (1880).
W. Prandtl and N. Murschhauser; Z. Anorg. Allg. Chem.; 60, 441 (1908).
G. Canneri; Gazzetta Chimica Italiana; 58, 6 (1928).
E. Banks and A. Wold; "Preparative Inorganic Synthesis"; vol. 4, W. L. Jolly, editor; Interscience; New York; 1968; pp., 237–268.
J. van den Berg, A. J. van Dillen, J. W. Geus, M. C. Stolk; Ber. Bunsenges.; Phys. Chem.; 87; pp. 120–123 (1983).

Primary Examiner—Robert L. Stoll
Assistant Examiner—Wayne A. Langel
Attorney, Agent, or Firm—Geoffrey L. Chase; James C. Simmons; William F. Marsh

[57] ABSTRACT

Separation of oxygen from air is performed in a continuous, cyclic manner using vanadium bronze liquid slurries as reversible chemical absorbents, absorbing at elevated temperature and desorbing at lowered temperature.

7 Claims, 2 Drawing Sheets

HIGH TEMPERATURE OXYGEN RECOVERY WITH REVERSIBLE CHEMICAL REACTION

TECHNICAL FIELD

The present invention is directed to the field of air separation using chemical absorbents. More particularly, the present invention is directed to recovering oxygen from air using chemical absorbents commonly referred to as vanadium bronzes.

BACKGROUND ON THE PRIOR ART

It is known in the prior art to separate oxygen from air using a molten stream of an oxygen acceptor comprising a liquid containing alkali metal nitrate and nitrate salts. This fundamental chemical air separation is set forth in U.S. Pat. No. 4,132,766. At least some energy of compression of the air feed to such a separatory process is recovered by the expansion of oxygen depleted gas from the separatory process.

The coproduction of oxygen and nitrogen as relatively pure products of a chemical separation utilizing the alkali metal salts of nitrite and nitrate materials is also known. In U.S. Pat. No. 4,287,170, air is contacted sequentially with such alkali metal salts, and then residual oxygen is scavenged from the oxygen depleted effluent with an absorption media, such as manganese oxide. At least some energy of compression for the feed air is recovered by expanding the nitrogen product to a lower pressure.

This prior art (U.S. Pat. No. 4,132,766 and U.S Pat. No. 4,287,170) is not uniquely integrated by heat exchange with a combustion process to co-produce a high temperature process stream, oxygen and nitrogen.

U.S. Pat. No. 4,340,578 discloses a method for producing oxygen with a chemical absorbent solution of molten alkali metal nitrite and nitrate salts wherein the salt solution contains additional oxides in low concentration, and the oxygen depleted effluent from the chemical separation is combusted with fuel and expanded to recover power in two stages. The combustion effluent is heat exchanged with the air feed and the oxygen product to elevate the air feed to absorption conditions. The molten salt absorbent solution is depressurized to release the reversibly contained oxygen therefrom and provide an oxygen product.

Other patents of interest to the use of alkali metal nitrate and nitrite molten salt absorbents for oxygen include: U.S. Pat. Nos. 4,521,398, 4,526,775, 4,529,577, 4,708,860 and 4,800,070.

U.S. Pat. No. 3,310,381 discloses the recovery of oxygen from air using a suspension of solid absorbent in a liquid carrier in a cocurrent contact of air and absorbent. Temperatures above 500° C. are recited for the system which uses barium oxide and barium peroxide. The patent process is a continuous version of the Brin process using a pressure and temperature swing cycle. Feed air cocurrently contacts the barium oxide/barium peroxide suspension in an absorber which heat exchanges with an external heat exchange fluid. The absorber operates at approximately 600° C. and a pressure slightly above atmospheric pressure. The oxidized acceptor is further heated to approximately 800° C. in a heater. The high temperature oxidized acceptor is reduced in pressure and desorbs oxygen with attendant reduction in temperature to 720° C. The partial pressure of the oxygen in the acceptor is determined by temperature because the barium oxide and barium peroxide are always present in the suspension of acceptor.

U.S. Pat. No. 4,617,182 is directed to a chemical separation of oxygen from air using the high temperature heat from a stand-alone process to effect the desorption of oxygen from a chemical absorbent. In addition, the patent discloses the use of a salt-to-salt heat exchanger which effectively transfers heat to a low temperature chemical absorbent from a high temperature chemical absorbent in the same cyclic loop.

U.S. Pat. No. 4,746,502 discloses a similar air separation system to recover oxygen using a chemical absorbent wherein a salt-to-salt heat exchanger is used to indirectly transfer heat from the high temperature chemical absorbent to low temperature chemical absorbent, all within different portions of a cyclic, closed system.

The evolution of oxygen and the simultaneous formation of a solid phase during the cooling of a melt composed of $V_2O_5$ and a metal oxy salt was observed as early as 1880 by P. Hautefeville, C. R. Acad. Sci., 90, 744 (1880). These reactions were examined further during the early 1990's by W. Prandtl and H. Murschhauser as reported in Z. Anorg. Allg. Chem., 60, 441 (1908) and G. Canneri, Gazzetta Chimica Italiana, 58, 6 (1928). It was found that when the oxy salt was $Na_2O$ or $K_2O$, the maximum quantity of oxygen was obtained when the mole ratio of metal oxy salt to $V_2O_5$ was approximately 0.15 to 1.

It was not until the last three decades that these solid phases, termed vanadium bronzes, have been extensively studied and characterized. A review by E. Banks and A. Wolf gives a good count of the work done on the vanadium bronzes, as well as other transition metal bronzes, up to 1968, as reported in E. Banks and A. Wold, in "Preparative Inorganic Synthesis," vol. 4, W. L. Jolly, editor, Interscience, New York, 1968, pp. 237 through 268. The vanadium bronzes are still of interest, particularly in terms of their physical and catalytic properties. A recent article references several catalytic papers and describes an optical microscopic study of the oxygen evolution during the formation of the $\beta K_{0.23}V_2O_5$ bronze as reported in J. Vandenberg, H. A. Van Dillen, J. W. Gens, and M. C. Stolk, Ber. Bunsenges. Phys. Chem., 87, pp. 120 through 123 (1983).

Using the known vanadium bronzes in a cyclic continuous process, such as is exemplified by the air separation techniques described in the patents above using alkaline metal salts of nitrate and nitrite, the present invention provides an effective and energy efficient method of recovering oxygen as well as nitrogen using the high temperature heat from preferably stand-alone industrial processes wherein the heat is utilized in a novel context to provide such oxygen and nitrogen and residual usable heat for a bottoming cycle as will be described in greater detail below.

BRIEF SUMMARY OF THE INVENTION

The present invention is a continuous process for separating oxygen from air by reversible chemical absorption at a relatively high temperature and desorption at a relatively low temperature comprising the steps of contacting air with a liquid slurry of a chemical absorbent for oxygen having a composition of: $M_xV_2O_5$, wherein M equals lithium, sodium, potassium, silver or mixtures thereof, and $0 < X < 1$, and heating the liquid slurry to a temperature in the range of approximately 630° C. to 870° C. to absorb at least a portion of the oxygen from the air and oxidize the liquid slurry to a predominantly liquid $M_2O/V_2O_5$ mixture; separating the oxygen depleted air from the oxidized liquid, cooling the oxidized liquid to a temperature in the range of approximately 370° C. to 500° C. to desorb oxygen from the liquid mixture and to generate the liquid slurry and separating the oxygen from the liquid slurry.

Preferably, the heat used in heating liquid slurry to a temperature in the range of 630° C. to 870° C. is derived by indirect heat exchange with a process selected from the group consisting of flue gas of a steam boiler, flue gas of a partial oxidation gas fire, flue gas from a Claus sulfur plant, flue gas from a steam-methane reformer, flue gas from an ethylene plant, a fluidized catalytic cracker regenerator and a fluidized bed combustor.

Preferably the cooling of the oxidized liquid is provided by indirect heat exchange with water to produce steam.

Preferably at least a portion of the heat used to assist in absorption with the liquid slurry and at least a portion of the cooling used for desorption of the liquid is derived by indirect heat exchange of the liquid slurry undergoing absorption with the liquid undergoing desorption.

Alternatively, the heat of absorption is derived from indirect heat exchange with an elevated temperature oxygen-lean molten salt of alkali metal nitrates and nitrites and the cooling of desorption is derived from indirect heat exchange with a lower temperature, oxygen-rich molten salt of alkali metal nitrates and nitrites which are used in a cyclic chemical air separation for recovery of oxygen from air.

Preferably the air feed is pressurized before contacting the liquid slurry. Optimally, the air is pressurized to approximately 207 k Pa.

DETAILED DESCRIPTION OF THE INVENTION

Figure 1:
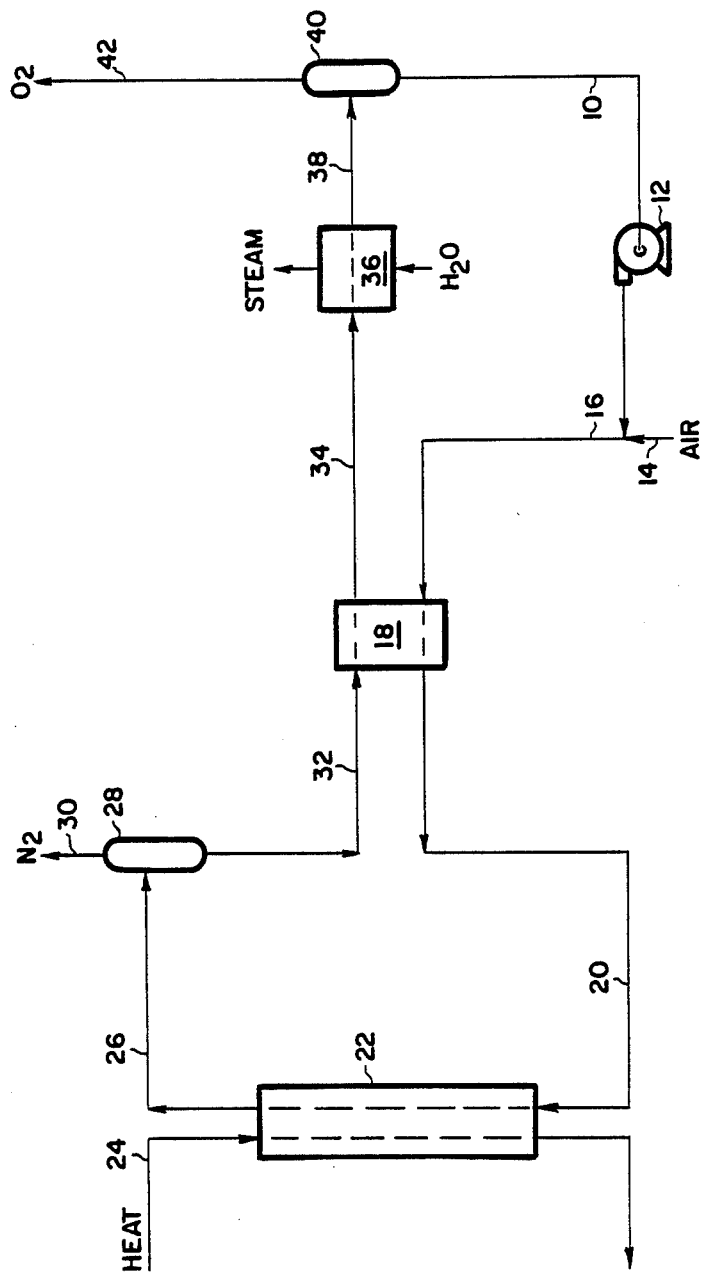
FIG. 1 is a schematic illustration of a preferred embodiment of the present invention.

The present invention is directed to the efficient utilization of export high quality heat in a reversible chemical oxygen absorptive reaction with the subsequent generation of product oxygen and potentially product nitrogen that uses high quality heat as heat of reaction to absorb oxygen out of an oxygen-containing gas stream, most preferably air. The heat retained in the chemical absorbent after desorption of oxygen is then rejected to a lower temperature work recovery bottoming cycle or for process heat use. This invention provides an efficient utilization of such high quality heat with the cost effective generation of oxygen and/or nitrogen from air.

The chemical absorbent which is utilized in a slurry state is a vanadium bronze, which is a term of art in the appropriate chemical technology which refers to a compound of the formula: $M_xV_2O_5$ containing a metal wherein M is equal to lithium, sodium, potassium, silver or mixtures thereof and x is in the range $0 < x < 1$. These vanadium bronze compounds enter into reversible oxygen reactions according to the formula:

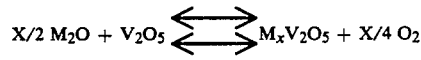

These reactions take place in a reversible manner over the range of 370° C. up to 870° C. The vanadium bronze materials, when in the reduced state as identified in the right-hand side of the equilibrium equation, will oxidize in the presence of oxygen when in the temperature range of 630° C. to 870° C. Correspondingly, the oxidized $M_2O/V_2O_5$ mixtures in accordance with the identification at the left-hand side of the equilibrium equation above will become reduced when the temperature is in the range of approximately 370° C. to 500° C.

The $M_2O/V_2O_5$ mixtures, when in the fully oxidized state, are fully liquid at the temperatures and pressures of the present invention. However, when the $M_2O/V_2O_5$ mixtures are reduced, a solid vanadium bronze forms, and such a liquid slurry two-phase dispersion is produced consisting of solid vanadium bronze and liquid $M_2O/V_2O_5$ mixture. Under appropriate conditions of flow and temperature and pressure, it is possible to maintain a cyclic, closed-circuit flow of the liquid and/or the liquid/slurry to provide a continuous air separation oxygen producing process.

The basic requirement of the present invention is the use of significantly elevated temperatures for absorption and lower elevated temperatures for desorption. This is the reverse of most absorption and desorption cycles which utilize low temperatures for absorption and high temperatures of desorption. The high temperatures necessary for operation of the present invention can be derived by indirect heat exchange of the liquid slurry of vanadium bronze chemical absorbent, such as heat exchange with the effluent gas from a flue gas from a combustion steam boiler, the effluent gas from a partial oxidation gasifier, the effluent from a Claus sulfur plant, the effluent gas from a steam methane reformer or the effluent gas from an ethylene plant. It is also possible to indireclty heat exchange the liquid chemical absorbent to the present invention through the fluidized bed of a fluidized catalytic cracker regenerator or a fluidized bed combustor. The process would typically utilize flue gas from a stand-alone process wherein the flue gas has a decreasing temperature of from 1,760° C. to 1,205° C. in the radiative and convective section of a boiler and from about 1,205° C. to 205° C. in the convective section of a boiler. The heat from such hot flue gas is used to drive the endothermic reaction identified above to absorb oxygen from air. Reversal of the above reaction to reduce the chemical absorbent and release oxygen is exothermic and so desorption of oxygen requires that heat be rejected to a bottoming cycle, such as the regeneration of steam.

The vanadium bronze materials having a composition of $M_xV_2O_5$ wherein the M is a metal chosen from the group consisting of lithium, sodium, potassium or silver and X is a valence of from $0 < x < 1$ provide a wide array of operable vanadium bronze chemical absorbents which absorb at elevated temperature and desorb at lowered temperatures when reacted with oxygen reversibly. In the present invention, three systems of silver vanadium bronze are contemplated to demonstrate the present invention. Each system requires different heat flow and vanadium bronze flowrates. In each system, the extent of conversion of the liquid $M_2O/V_2O_5$ mixture to solid vanadium bronze is less than 100% to maintain the components in the cycle in either the fully liquid state or in the slurry state. At no time is the conversion 100%, which would result in a fully solid vanadium bronze phase.

Bronze-A constitutes a silver vanadium bronze system operating between 500° C. and 630° C. The extent of reaction was 56%.

Bronze-B consists of a silver vanadium bronze system operating between 500° C. and 665° C. The extent of reaction was 64%.

Bronze-C consists of a silver vanadium bronze system operating between 500° C. and 705° C. The extent of reaction was 73%.

A description of the present invention will now be made using a first preferred embodiment described in conjunction with FIG. 1.

A silver vanadium bronze chemical absorbent in line 10, initially present as a slurry with liquid $M_2O/V_2O_5$ mixture, is pressurized in pump 12 to approximately 207 kPa. The vanadium bronze slurry is mixed with air in line 14 to produce an aerated, three-phase flow of fluid comprising a vanadium bronze slurry and gaseous air in line 16. The stream in line 16 enters a recuperative heat exchanger 18 which extracts heat from the $M_2O/V_2O_5$ liquid mixture in another portion of the cycle to heat stream 16 from approximately 500° C. up to a temperature in the range of 612° C. to 689° C. This elevated temperature vanadium bronze slurry stream in line 20 is then passed through a heater heat exchanger 22 which provides heat 24 from an external source, such as a stand-alone industrial process which could be flue gas as described above or heat from a fluidized bed. At these temperatures which approach 630° C. to 750° C., the gaseous air mixed with the vanadium bronze chemical absorbent react to bind oxygen from the air with the metal in the vanadium bronze to result in the oxidized predominantly liquid state at the left-hand side of the above equilibrium reaction. The oxidized chemical absorbent in line 26 is then removed to phase separation vessel 28 wherein oxygen-depleted air which potentially consitutes commercially pure nitrogen is removed in line 30 and the oxidized $M_2O/V_2O_5$ liquid mixture 32 is cooled in the recuperative heat exchanger 18 to a temperature of approximately 515° C. The oxidized liquid $M_2O/V_2O_5$ mixture in the line 34 is then further cooled in heat exchanger 36 by the production of steam from boiler feedwater in indirect heat exchange to cool the $M_2O/V_2O_5$ mixture is approximately 500° C. in line 38. The pressure is reduced to approximately 17 psia and oxygen is separated in phase separation vessel 40 by the action of reduced pressure and lowered temperature. The oxygen in line 42 is at least commercially pure oxygen. Heat can also be removed by use of cooling coils in vessel 40 with the generation of steam. The reduced vanadium bronze chemical absorbent returns to the slurry phase in line 10. The process is operated in a continuous, cyclic, closed-circuit basis wherein the chemical absorbent comprising vanadium bronze is elevated to a high temperature to absorb oxygen from air and is reduced in temperature to release oxygen for the recovery of the oxygen product separate from the feed air. Although the process of FIG. 1 shows air being mixed with the vanadium bronze chemical absorbent prior to elevated temperature heating, it is contemplated that such heating may take place prior to the introduction of air into the flow of the vanadium bronze chemical absorbent.

Figure 2:
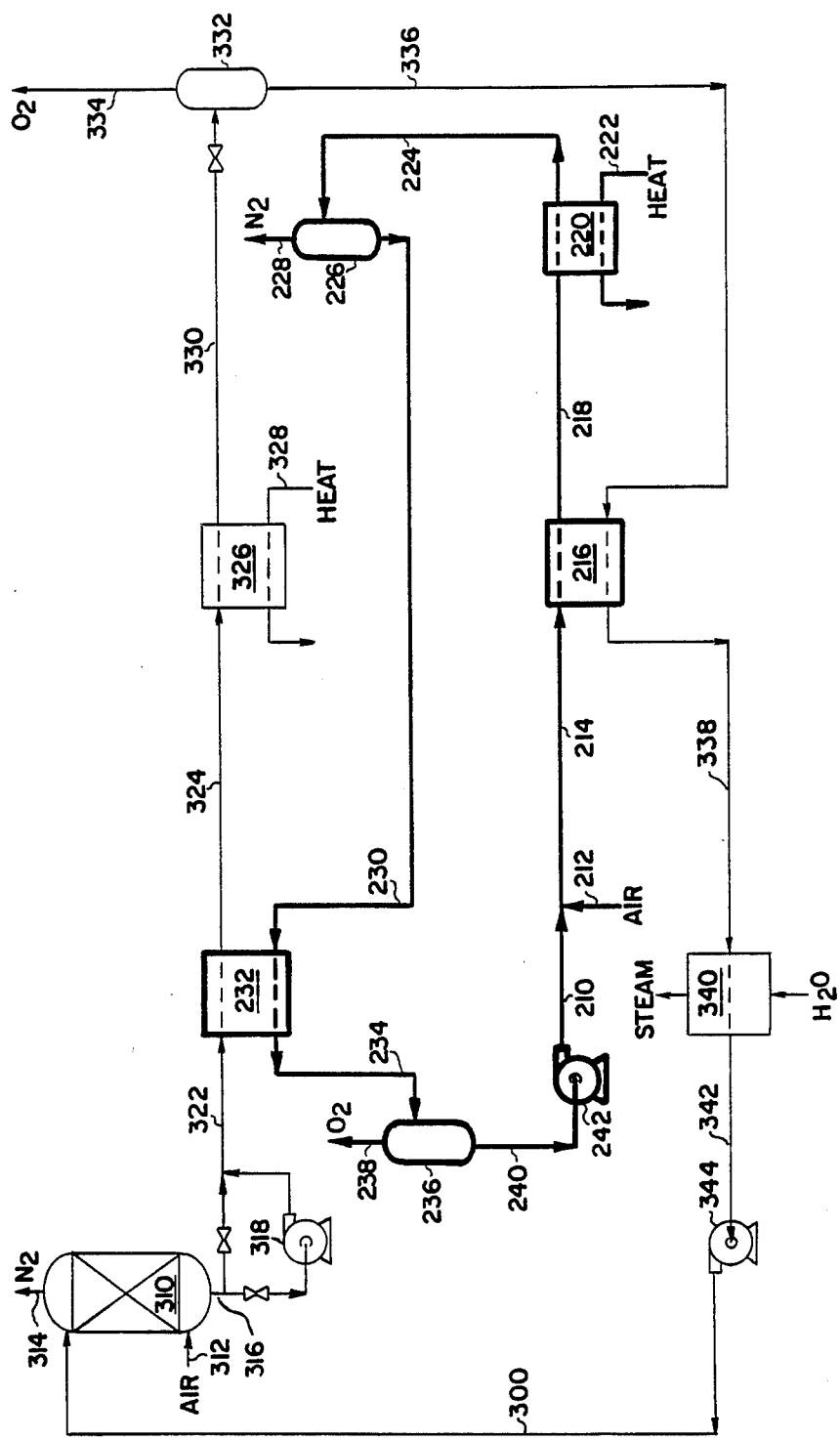
FIG. 2 is an alternative embodiment to the present invention showing integration with another chemical absorptive separation process.

FIG. 2 shows an alternate preferred embodiment of the present invention wherein the closed-circuit, cyclic process derives its heat and its cooling, in part, from an analogous chemical air separation technique using alkali metal nitrate and nitrite salts which absorb oxygen and desorb oxygen in an opposite fashion whereby the oxygen is absorbed at low temperature and desorbs at elevated temperature. Such a contrary mode of temperature operation provides a unique fit for tandem operation of the two cycles. The operation of a chemical air separation technique using alkali metal nitrate and nitrite salts are described in U.S. Pat. Nos. 4,132,766, 4,287,170, 4,340,578, 4,521,398, 4,426,775, 4,529,577, 4,565,685, 4,617,182, 4,708,860, 4,746,502, and 4,800,070, which are hereby incorporated by reference in their entirety herein.

Referring to FIG. 2, the closed-circuit cycle of the present invention is set forth in bold line in the interior of the schematic. Air in line 212 is introduced into a stream 210 containing vanadium bronze slurry chemical absorbent. The mixed stream including gaseous and slurry flow in line 214 is heated in heat exchanger 216 against a reduced chemical absorptive alkali metal nitrate and nitrite in line 336. The temperature is approximately 515° C. The stream in line 218 is heated in heat exchanger 220 against an outside source of heat in line 222, such as the flue gas or fluidized bed identified with the process as described with FIG. 1 above. The temperatures are in the range of 665° C. to 705° C. in line 224, for the chemical absorbent, and the oxygen reacts with the vanadium bronze of the chemical absorbent at this point in the process producing the predominantly liquid $M_2O/V_2O_5$ mixture.

The oxidized predominantly liquid $M_2O/V_2O_5$ is then separated from the oxygen-depleted air in phase separation vessel 226 wherein the oxygen-depleted air is removed in line 228. This stream may be commercially pure nitrogen depending upon the efficiency of the oxygen uptake. The stream in line 230 is then cooled, in heat exchanger 232 against oxidized chemical absorbent comprising alkali metal nitrate and nitrite in line 322, to a temperature of 500° C. The cooled $M_2O/V_2O_5$ mixture in line 234 then releases its oxygen and returns to a slurry upon introduction into phase separation vessel 236. The oxygen is removed as a gaseous stream in line 238 and is at least commercially pure oxygen. The reduced vanadium bronze chemical absorbent as a slurry phase is removed in line 240 at 117 kPa. It is pressurized in pump 242 to a pressure of 207 kPa.

The tandem chemical absorptive separation of oxygen from air using alkali metal nitrates and nitrites, which constitutes the outer circuit shown in FIG. 2, begins with reduced alkali metal nitrate and nitrite liquid chemical absorbent in line 300 at a relatively low elevated temperature introduced into absorber 310 which is fed countercurrently with air in line 312. Oxygen is absorbed by the chemical absorbent as it changes from a nitrite to a nitrate state and oxygen depleted air, which may constitute at least commericially pure nitrogen, is removed in line 314. The oxidized alkali metal nitrate and nitrite chemical absorbent is removed in line 316 and for the Bronze C case, elevated in pressure in pump 318 to 214 kPa. The stream continues in line 322 where it is heated from 482° C. to a temperature in the range of 589° C. to 688° C. in a heat exchanger 232 against the cooling liquid $M_2O/V_2O_5$ in line 230.

The alkali metal nitrate and nitrite chemical absorbent passes in line 324 to be heated in heater exchanger 326 against an outside heat source 328 which may or may not be similar to the heat source 222. The elevated temperature alkali metal of nitrate and nitrite chemical absorbent in line 330 is then reduced in pressure across a valve as it enters a phase separation vessel 332. At the elevated temperature and reduced pressure of 117 kPa, the alkali metal nitrate and nitrite chemical absorbent is reduced and releases oxygen in line 334 as a gaseous stream, which is at least commercially pure oxygen. The high temperature, low pressure, reduced alkali metal nitrate and nitrite chemical absorbent in the liquid molten state passes in line 336 to heat exchanger 216 where it is cooled by heating the vanadium bronze chemical absorbent in line 214. The alkali metal nitrate and nitrite chemical absorbent in line 338 is further cooled in heat exchanger 340 by the production of steam from boiler feedwater. The absorbent in line 342 is at a temperature of 417° C. It is repressurized in pump 344 to approximately 207 kPa.

The embodiment in FIG. 2 demonstrates that these two chemical absorptive separation techniques using closed cycle, separate systems for recovery of oxygen from air provide unique integration both in their cooling and heating whereby one cycle absorbs oxygen at elevated temperature, while the other cycle desorbs oxygen at elevated temperature and the first cycle desorbs oxygen at reduced temperature while the second cycle absorbs oxygen at reduced temperature so as to create a unique opportunity to heat exchange one with the other after use of heat energy in one cycle wherein such heat can be effectively utilized in the second cycle prior to the efficient final use of the residual heat in an appropriate traditional bottoming cycle.

The various performance capabilities of the prior art nitrate/nitrite system and the three above-identified bronze systems as well as combinations of those bronze systems and the prior art nitrate/nitrite system are identified in a heat material balance in Table 1 set forth below:

requirement of the prior art chemical absorbent system using alkali metal nitrate and nitrite. However, the melt flow and heat exchanger size are about twice the requirement for the prior art chemical absorbent system.

In comparison, the combination hybrid process of FIG. 2 using both the prior art chemical absorptive system of alkali metal nitrate and nitrite along with the process of the present invention, comprising a chemical absorbent of the vanadium bronze, provides a melt flow rate and heat exchanger duty of only approximately 35% higher than the alkali metal nitrate and nitrite chemical absorbent system alone and heat duty of approximately 30% less than the prior art chemical absorptive alkali metal and nitrate and nitrite systems. Such a comprise of capital and energy requirements provides a unique capability for the present invention particularly when integrated with prior art chemical absorptive system using alkali metal nitrate and nitrite.

The present invention has been set forth with reference to several preferred embodiments, but the full scope of the invention should be ascertained from the claims which follow.

We claim:

1. A continuous process for separating oxygen from air by a reversible chemical absorption at relatively high temperature and desorption at a relatively low temperature comprising the steps of:
(a) contacting air with a liquid slurry of a chemical absorbent for oxygen having a composition of $$M_xV_2O_5$$

wherein M=Li, Na, K, Ag, or mixture thereof and $0<x<1$, and heating the liquid slurry to a temperature in the range of approximately 630° C. to 870° C. to absorb at least a portion of the oxygen from the air and oxidize the liquid slurry to a predominantly liquid $M_2O/V_2O_5$ mixture;
(b) separating the oxygen depleted air from the oxi-

TABLE 1

| | Key Parameters of All Cases Used to Demonstrate the Idea | | | | | | |
|---|---|---|---|---|---|---|---|
| | Nitrate/ | | | | Nitrate/Nitrate and Bronze | | |
| Case | Nitrate | Bronze-A | Bronze-B | Bronze-C | Comination-A | Combination-B | Combination-C |
| Air Flow, kg/hr | | | | | | | |
| Nitrate/Nitrate Loop | 181 | — | — | — | 130 | 111 | 114 |
| Bronze Loop | — | 181 | 181 | 181 | 52 | 70 | 67 |
| Melt Flow, kg/hr | | | | | | | |
| Nitrate/Nitrate Loop | 2,524 | — | — | — | 1,802 | 1,547 | 1,590 |
| Bronze Loop | — | 5,788 | 5,047 | 4,427 | 1,656 | 1,953 | 1,638 |
| Oxygen Production, Tonnes/D | | | | | | | |
| Nitrate/Nitrate Loop | 0.9 | — | — | — | 0.643 | 0.552 | 0.567 |
| Bronze Loop | — | 0.9 | 0.9 | 0.9 | 0.257 | 0.348 | 0.333 |
| Recuperator Duty, Cal. kg./hr | | | | | | | |
| Nitrate/Nitrate Loop | 122,075 | — | — | — | 79,094 | 119,364 | 122,838 |
| Bronze Loop | — | 241,248 | 277,592 | 305,077 | 79,094 | 67,811 | 69,857 |
| Heater Duty, Cal. kg./hr | | | | | | | |
| Nitrate/Nitrate Loop | 72,618 | — | — | — | 59,988 | — | — |
| Bronze Loop | — | 35,304 | 30,844 | 26,918 | — | 51,494 | 52,982 |
| Cooler Duty, Cal. kg./hr | | | | | | | |
| Nitrate/Nitrate Loop | 70,423 | — | — | — | 58,266 | 50,006 | 51,461 |
| Bronze Loop | — | 35,304 | 30,843 | 26,918 | — | — | — |

With reference to FIG. 1, the heat exchanger 18 which allows heat exchange between one stage of the chemical absorbent and the opposite stage of the chemical absorbent has been found to enable the recovery of 85 to 90% of the heat requirement in a silver embodiment of the vanadium bronze chemical absorbent system. The heat duty is thereby reduced to one-half of the dized liquid mixture;
(c) cooling the oxidized liquid mixture to a temperature in the range of approximately 370° C. to 500° C. to desorb oxygen from the liquid mixture and regenerate the liquid slurry; and
(d) separating the oxygen from the liquid slurry.

2. The process of claim 1 wherein the heat of step (a) is derived by indirect heat exchange with flue gas of a steam boiler, flue gas at a partial oxidation gasifier, flue gas from a Claus sulfur plant, flue gas from a stream-methane reformer, flue gas from an ethylene plant, a fluidized catalytic cracker regenerator or a fluidized bed combustor.

3. The process of claim 1 wherein the cooling of step (c) is derived from indirect heat exchange with water to produce steam.

4. The process of claim 1 wherein at least a portion of the heat of step (a) and at least a portion of the cooling of step (c) is derived by indirect heat exchange of the liquid slurry undergoing step (a) with the liquid mixture undergoing step (c).

5. The process of claim 1 wherein the heat of step (a) is derived from indirect heat exchange with an elevated temperature, oxygen-lean molten salt of alkali metal nitrates and nitrites and the cooling of step (c) is derived from indirect heat exchange with a lower temperature, oxygen-rich molten salt of alkali metal nitrates and nitrites.

6. The process of claim 1 wherein the air is pressurized before contacting the liquid slurry.

7. The process of claim 6 wherein the pressure is approximately 207 kPa.

* * * * *